United States Patent [19]
Yuan et al.

[11] Patent Number: 6,055,433
[45] Date of Patent: Apr. 25, 2000

[54] DATA PROCESSING SYSTEM AND METHOD FOR BALANCING A LOAD IN A COMMUNICATIONS NETWORK

[75] Inventors: Wei Yuan, Plano; Surnjani Djoko, Richardson; Sairam Subramanian, Garland; Seshu Madhavapeddy, Richardson; Payam Maveddat, Plano, all of Tex.

[73] Assignee: Northern Telecom Limited, Quebec, Canada

[21] Appl. No.: 08/832,517

[22] Filed: Apr. 3, 1997

Related U.S. Application Data

[60] Provisional application No. 60/026,434, Sep. 20, 1996.

[51] Int. Cl.$^7$ ...................................................... H04Q 7/22
[52] U.S. Cl. ......................... 455/453; 455/422; 455/507; 455/560
[58] Field of Search ..................................... 455/453, 448, 455/422, 432, 435, 450, 451, 452, 507, 509, 510, 514, 67.1, 560; 370/252, 253, 465, 468

[56] References Cited

U.S. PATENT DOCUMENTS 5,210,787  5/1993  Hayes et al. ............................. 455/435

OTHER PUBLICATIONS

Alanyali, Murat, et al., "On Simple Algorithms for Dynamic Load Balancing," Proceedings, IEEE INFOCOM '95, pp. 230–238, vol. 1.

Kremien, Orly, et al., "Methodical Analysis of Adaptive Load Sharing Algorithms," IEEE Transactions on Parallel and Distributed Systems, vol. 3, No. 6, Nov., 1992, pp. 747–760.

Kunz, Thomas, "The Influence of Different Workload Descriptions on a Heuristic Load Balancing Scheme," IEEE Transactions on Software Engineering, vol. 17, No. 7, Jul., 1991, pp. 725–730.

Schaar, Margaret, et al., "Heuristic Algorithms for Adaptive Load Sharing in Local Networks," Systems Integration '90, Nov. 22, 1989, pp. 762–770.

*Primary Examiner*—Lee Nguyen
*Attorney, Agent, or Firm*—Carr & Storm, L.L.P.

[57] ABSTRACT

A data processing system implements a load balancing methodology which recognizes the effects that multiple, mobile subscribers have within a wireless communications network. During execution of this load balancing methodology, a rehoming operation is executed at a telephone central office to move some subscribers in a network to a new home mobile switching center with a minimum number of rehoming steps. To perform this rehoming operation, a mobile switching center in a network which has a highest load is selected first. Mobile switching centers which have a load lower than a network average load are considered to be candidates for a rehome destination. All subscriber groups homed to the highest loaded mobile switching center are evaluated to determine whether or not a rehoming operation using this subscriber group would provide a highest benefit and give a lowest standard deviation of loads among mobile switching centers after the rehome operation is selected. This operation is iterative and searches for the best directory number to be homed in each candidate mobile switching center. A resulting balanced load of network resources will serve to increase the effectiveness and longevity of a current wireless communications network before additional equipment is required.

27 Claims, 8 Drawing Sheets

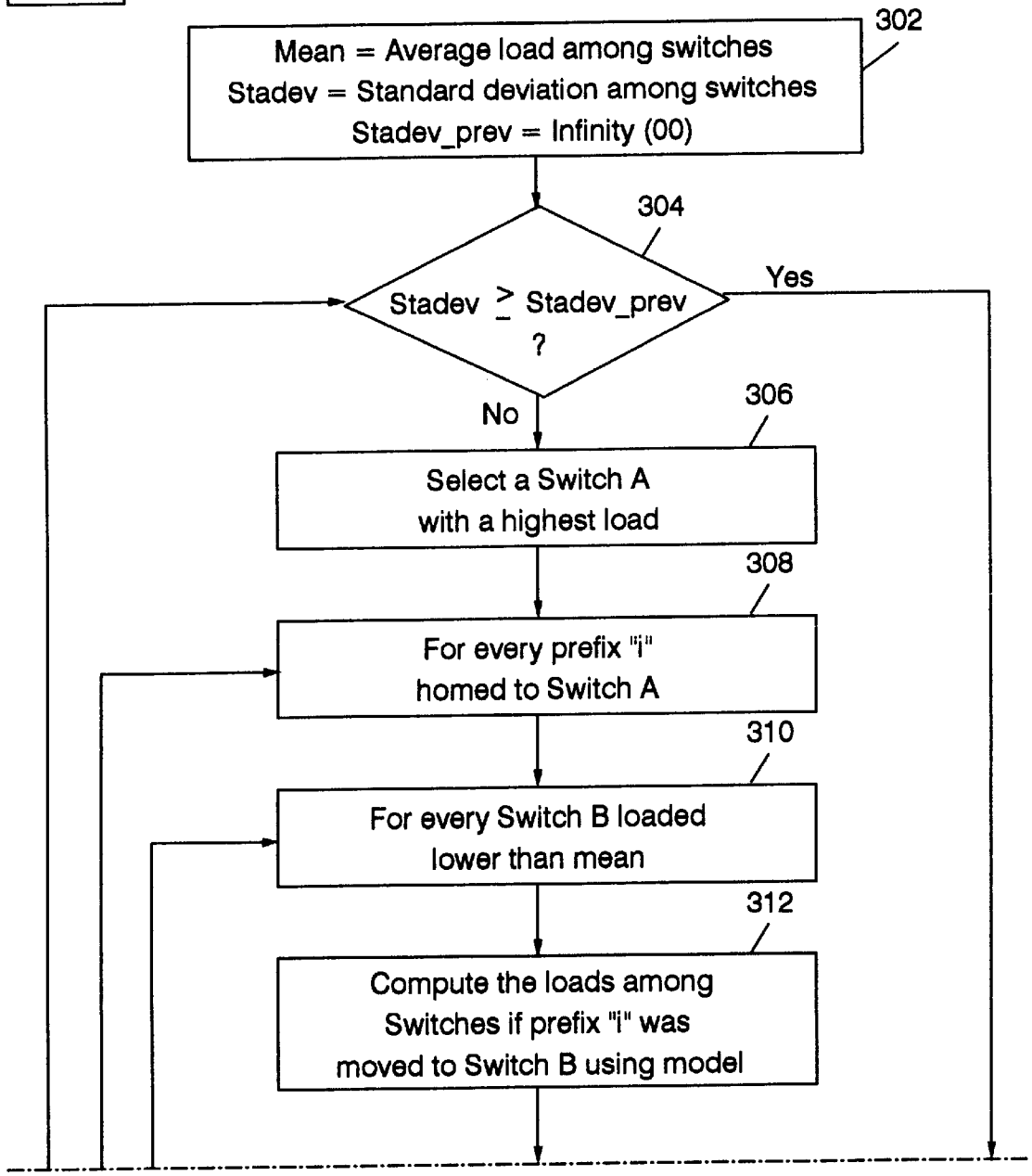

DATA PROCESSING SYSTEM AND METHOD FOR BALANCING A LOAD IN A COMMUNICATIONS NETWORK

This application claims the benefit of U.S. Provisional Application Ser. No. 60/026,434, filed Sep. 20, 1996.

TECHNICAL FIELD

The present invention relates in general to balancing a load on a plurality of components in a communications network, and in particular, to balancing a load among mobile switching centers in a wireless communications network.

BACKGROUND INFORMATION

With the advent of widespread use of cellular telephones and the corresponding growth of wireless subscribers for using such telephones, a need has arisen for maximizing a network's capacity within an existing communication infrastructure. Before describing how this need has been addressed, however, a general structure of a communications system will be described. The infrastructure of a communications network generally includes multiple mobile switching centers (MSCs) which provide control, tracking, and data about mobile users within a predetermined area.

A distributed home location register wireless network architecture is typically utilized to establish an infrastructure for a wireless communications network. In such an architecture, the home MSC tracks and determines where the mobile user is currently registered. A mobile user is registered on a home location register (HLR) within a home mobile switching center (MSC). When the mobile user travels away from their home MSC, the mobile user is detected by a second mobile switching center. The second mobile switching center then provides information to the home MSC. The home MSC registers the location of the mobile user on a visiting location register (VLR) within the MSC visited.

Subsequently, when a call is received by a current MSC, the current visited MSC determines whether or not the mobile user to whom the call is directed is registered in the HLR or is registered in the VLR. If the mobile user is registered in the VLR, the home MSC transmits information to the mobile user's current MSC. Through this method, the home MSC is able to transfer the call to the current MSC so that the mobile user receives the call even when they are not within their own home MSC.

In such a distributed wireless network architecture, the mobility of subscribers is a significant factor in resource allocation and has a tremendous impact on network capacity since a subscriber must be located on a regular basis to indicate whether or not that user should be registered on a home location register or a visiting location register. Given the demands made on an MSC in making this determination, it is possible for some mobile switching centers to be heavily loaded, while others are lightly loaded due to an ad hoc distribution of subscribers. Such an uneven loading results in a poor overall network performance because some MSCs are functioning at their maximum capacity and expending all of their resources, while other MSCs are barely being utilized at all. Without an even distribution of resources, it is difficult to achieve maximum effectiveness and, hence, the maximum user capacity of an existing network.

Improving network performance by balancing a load on each of the MSCs in a communications network has piqued considerable interest by the communications industry.

Typically, the problem of a load in a communications network balancing is categorized as a resource allocation problem where a control variable is an "assignment policy." While an objective of resource allocation varies with the application to which it is being applied, often the underlying idea is allocating a total load across multiple resources as evenly as possible. Three main types of load balancing problems have been studied by numerous authors. In an article entitled "Heuristic Algorithms for Adaptive Load Sharing in Local Networks," published in *Systems Integration*, pp. 762–770 in 1990, Schaar, et al. apply heuristic techniques to solve the load balancing problems. Additionally, Kunz in "The Influence of Different Workload Descriptions on a Heuristic Load Balancing Scheme," published in *IEEE Transactions on Software Engineering*, Vol. 17, No. 7, pp. 725–730, on July 1991, also implement heuristic techniques to solve such loading problems. In an article entitled "On Simple Algorithms for Dynamic Load Balancing," published in *Proceedings of IEEE INFOCOM*, Vol. 1, pp. 230–238, 1995, by Alanyali et al. incorporates finite capacity constraints on resources to solve this loading problem. Additionally, another technique developed by Kremien et al. considers information dissemination in allocation decision-making in their article on load balancing entitled "Methodical Analysis of Adaptive Load Sharing Algorithms," published in *IEEE Transactions on Parallel and Distributed Systems*, Vol. 3, No. 6, pp.747–760 of November 1992. It should be noted, however, that terminal or subscriber mobility issues were not considered in any of the above-mentioned studies. Therefore, the studies mentioned above fail to provide an adequate solution for balancing the loads amongst mobile switching centers, as the mobility of subscribers is not accounted for.

Therefore, it is desirable to have a load balancing strategy which accounts for mobility of subscribers in a communications network so that the existing communications infrastructure may be more effectively and efficiently utilized.

SUMMARY OF THE INVENTION

The previously mentioned needs are fulfilled with the present invention. Accordingly, there is provided, in a first form, a method for balancing a number of operations to be performed by a plurality of data processors. The method includes the steps of determining which mobile switching center in a communications network has a highest load. Subsequently, mobile switching centers which have loads lower than a network average load are considered to be candidates for rehoming a group of mobile telephone users from the highest loaded mobile switching center. All subscriber groups homed to the highest loaded mobile switching center are iteratively evaluated to determine whether or not a rehoming operation using the subscriber group will provide a highest benefit and give a lowest standard deviation of loads among mobile switching centers after the rehoming operation is performed. After a group of mobile telephone users and the mobile switching center to which that group should be moved are identified, that group of mobile telephone users is rehomed to the new mobile switching center. A resulting balanced load of the network resources provides increased effectiveness and efficiency of the wireless communications network.

Additionally, there is provided, in a second form, a data processing system. The data processing system includes a memory for storing a software program and a central processing unit coupled to the memory for accessing the software program. The central processing unit identifies a group of mobile telephone users in a communication network to be moved from a first mobile switching center to a second mobile switching center in response to the software program. The central processing unit includes a device for calculating an average load of each of a plurality of mobile switching centers in the communication network. The central processing unit also includes a device for calculating a standard deviation between the load of each of the plurality of mobile switching centers and the average load of the plurality of mobile switching centers. Also included is a device for selecting a first mobile switching centers having a highest load. The central processing unit also includes a device for selecting a first one of a plurality of mobile telephone users assigned to the first mobile switching center and a device for selectively, consecutively assigning the first one of the plurality of mobile telephone users to each of a remaining portion of the plurality of mobile switching centers.

The central processing unit also includes a device for consecutively calculating a load of each of the plurality of mobile switching centers after the first one of the plurality of mobile telephone users is assigned to each of the remaining portion of the plurality of mobile switching centers. The central processing unit also includes a means for consecutively calculating both a standard deviation between the load of each of the plurality of mobile switching centers after the first one of the plurality of mobile telephone users is assigned to each of the remaining portion of the plurality of mobile switching centers and an average load of the plurality of mobile switching centers. The central processing unit further includes a device for identifying a selected one of the plurality of mobile telephone users which results in a lowest standard deviation between the load of each of the plurality of mobile switching centers and the average load of each of the plurality of mobile switching centers.

There is also provided, in a third form, a program storage device readable by a machine, tangibly embodying a program of instructions executable by the machine to perform method steps for balancing a load of each of a plurality of mobile switching centers in a communication network in accordance with the previously described method steps.

The foregoing has outlined rather broadly the features and technical advantages of the present invention in order that the detailed description of the invention that follows may be better understood. Additional features and advantages of the invention will be described hereinafter which form the subject of the claims of the invention.

BRIEF DESCRIPTION OF THE DRAWINGS

For a more complete understanding of the present invention, and the advantages thereof, reference is now made to the following descriptions taken in conjunction with the accompanying drawings, in which:

FIG. 3-B illustrates, in flow diagram form, a remaining portion of the methodology of FIG. 3-A;

DETAILED DESCRIPTION

Figure 1:
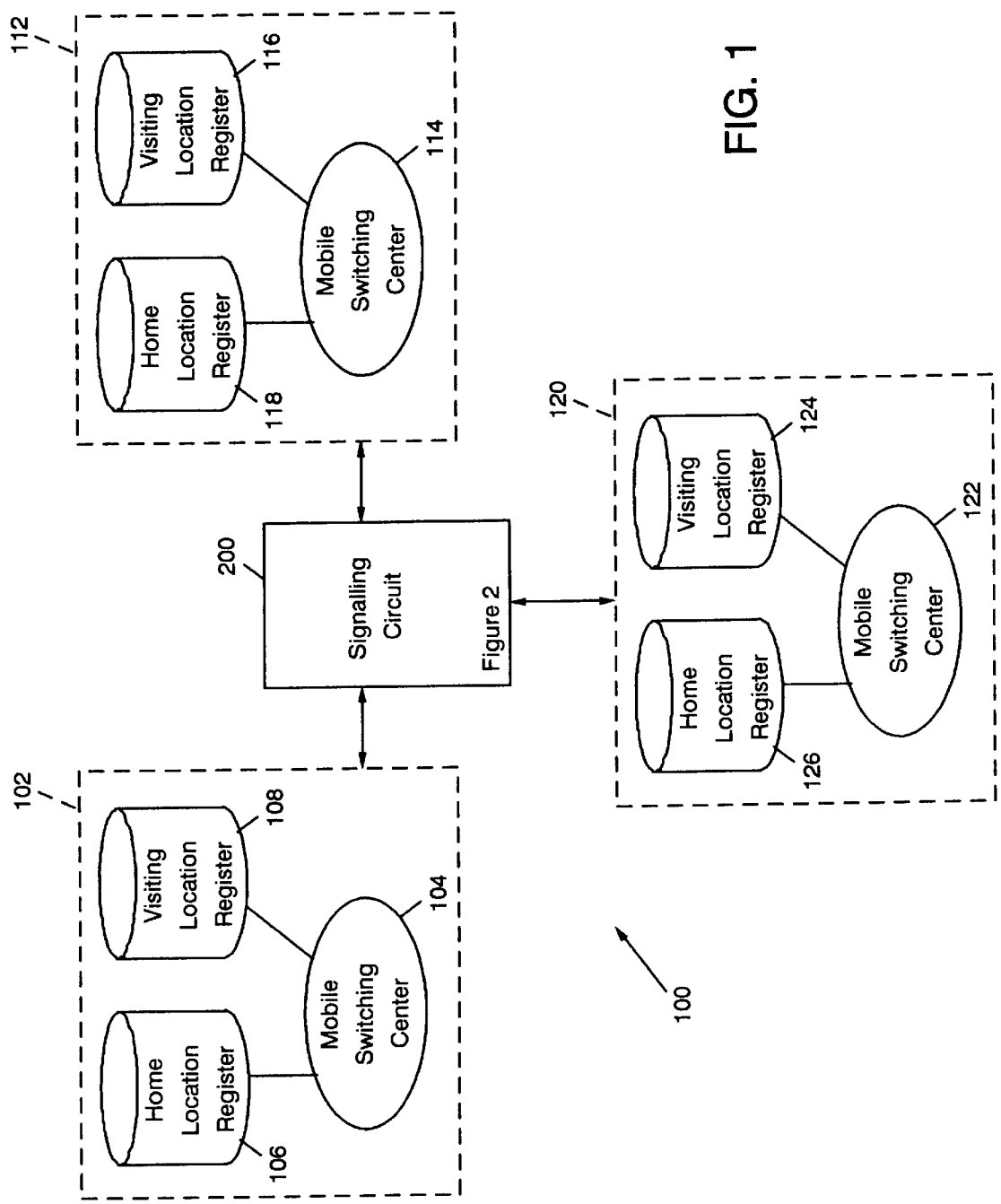
FIG. 1 illustrates, in block diagram form, a wireless network with a distributed home location register architecture.

With the growth of subscribers in wireless communications networks having multiple mobile switching centers, the mobility of subscribers is a significant factor in resource allocation. For example, in view of subscriber's mobility, it is very likely that the real-time loading of mobile switching centers will be unbalanced in wireless communications networks. Such an unbalanced use of resources results in an ineffective utilization of the network infrastructure for providing services in a timely and efficient manner. The present invention recognizes that a total network capacity for servicing subscribers can be maximized with an existing number of mobile switching centers if the subscriber groupings in a home location register (HLR) are properly distributed. In the present invention, a load balancing methodology is developed which recognizes the effects that multiple mobile subscribers have within a network. Through the implementation of the present invention, the load balancing dilemma is solved by executing a rehoming operation at a telephone central office to move some subscribers in a network to a new home mobile switching center with a minimum number of rehoming steps. Such a rehoming operation increases a total network performance and significantly increases network capacity. Additionally, a resulting balanced load of network resources will increase the effectiveness and longevity of the current network before additional equipment is required. This, in turn, will help maximize the return on an operator's investment.

The present invention performs this rebalancing or rehoming operation by iteratively calculating predicted loads on multiple mobile switching centers resulting from a movement of a group of mobile telephone users from a heavily loaded mobile switching center to another, less used one of the multiple mobile switching centers. The rebalancing operation of the present invention is performed using a data processing system. In the data processing system, data indicating the loading of subscriber groupings in mobile switching centers is retrieved and evaluated using well-known measurement techniques. During the evaluation process, the data processing system determines which mobile switching center has a highest load. Subsequently, the data processing system iteratively determines the loading effects among all mobile switching centers when each of the groups of mobile telephone users assigned to the highest loaded mobile switching center is moved, or rehomed, to each of the other mobile switching centers. When the movement of one group of mobile telephone users from the highest loaded mobile switching center to another mobile switching center results in a more balanced allocation of resources among all of the mobile switching centers, the data processing system of the present invention reassigns that group of mobile telephone users to the other mobile switching center so that all resources within the communication network are utilized effectively and efficiently. Operation and implementation of the present invention will subsequently be described in greater detail.

In the following description, numerous specific details are set forth to provide a thorough understanding of the present invention. However, it will be obvious to those skilled in the art that the present invention may be practiced without such specific details. In other instances, well-known circuits, devices, and network components have been shown in block diagram form in order not to obscure the present invention in unnecessary detail. For the most part, details concerning timing considerations and the like have been omitted inasmuch as such details are not necessary to obtain a complete understanding of the present invention and are within the skills of persons of ordinary skill in the relevant art.

Refer now to the drawings wherein depicted elements are not necessarily shown to scale and wherein like or similar elements are designated by the same reference numeral through the several views.

Description of a Wireless Communication Network

FIG. 1 illustrates a simplified view of the wireless communication network 100 with a distributed home location register architecture. In such an architecture, subscribers are partitioned into several groupings. Such groupings are labeled 102, 112 and 120 in FIG. 1. A grouping is often based on a subscriber's directory number. After being grouped, each member of the group is connected (or homed) to a mobile switching center (MSC) in the network. For example, if a subscriber is grouped into group 102 of FIG. 1, that subscriber is then homed to mobile switching center (MSC) 104 within that group. It should be noted that when a user is traveling within an area corresponding to the home mobile switching center, the user is registered in the home location register corresponding to the mobile switching center. Therefore, when a user is assigned to group 102, the user is registered within home location register 106 and mobile switching center 104 is the user's home mobile switching center.

Because of subscriber mobility, a number of subscribers that appears in a serving area of each mobile switching center of a distributed wireless network during busy hours is variable and is often an important factor to consider when determining how each of the mobile switching units in a group should be loaded. For example, consider the following "snapshot" of subscriber distribution during a busy hour as provided below in Table 1. It should be noted that the ability to measure a number of users for a given mobile switching center at a given time is well-known to those with skill in the data processing art.

TABLE 1

| Group Number | MSC 1 | MSC 2 | MSC 3 | MSC 4 | MSC 5 | MSC 6 | Home of Group |
|---|---|---|---|---|---|---|---|
| 1 | 16 | 2 | 19 | 13 | 7 | 8 | MSC 2 |
| 2 | 23 | 11 | 30 | 24 | 10 | 33 | MSC 2 |
| 3 | 848 | 1172 | 1719 | 1218 | 1721 | 1487 | MSC 3 |
| 4 | 1678 | 47 | 98 | 97 | 61 | 150 | MSC 1 |
| 5 | 276 | 141 | 249 | 3446 | 360 | 198 | MSC 4 |

Referring to TABLE 1, it should be noted that 16 subscribers appear in a serving area of a first mobile switching center, MSC1, during the busy hour while only 2 subscribers appear in a second mobile switching center, MSC2. The present invention recognizes that during such busy hours, heavily loaded mobile switching centers will have decreased efficiency and functionality as the limits of their operation are reached. By using the methodology of the present invention to rehome some of the subscribers from heavily loaded mobile switching centers to lightly loaded mobile switching centers, some capacity of the communications network can be recovered.

Before describing the methodology of the present invention in greater detail, it should be noted that there is a constraint in the rehoming process which requires that a whole group of subscribers be rehomed at a given time. For example, a whole group of subscribers having a certain prefix must be rehomed from one mobile switching center to another. Furthermore, for a given pair of mobile switching centers, the rehoming process decreases a load on one mobile switching center and increases the load of another mobile switching center. If an amount by which loading is decreased in one mobile switching center is much less than an amount by which loading is increased in another mobile switching center, the total network performance and efficiency may not be improved. Additionally, rehoming activities are costly to the service providers because calls are lost during this rehoming process and the service quality is adversely affected. Therefore, a number of rehoming steps should be minimized to maximize the efficient operation of the communications network. Each of these requirements is satisfied with the present invention which will subsequently be described in greater detail.

Evaluation of Subscriber Mobility

To understand the implementation of the present invention, it is important to first understand operation of each of the groups identified in FIG. 1. When evaluating subscriber mobility between each of the groups of FIG. 1, both call related network activities and Inter-Visiting Location Register (VLR) registration related activities must be considered as each of these activities affects a mobile switching center's real-time usage or loading. It should be noted that the call related network activities and inter-VLR registration related activities are control signals which are communicated between mobile switching centers to facilitate calls being transferred from one mobile switching center to another as a mobile telephone user travels from location to location. Call related network activities involve activities referred to as mobile termination activities, call delivery sent activities, and call delivery received activities.

There are also three different cases of inter-VLR registration. A first case occurs when a mobile user roams from a non-home mobile switching center to its home mobile switching center. Such an event involves registration at its home mobile switching center and registration cancellation at a serving, or non-home, mobile switching center. In a second case of inter-VLR registration, a mobile user roams from its home mobile switching center to a non-home mobile switching center. This event involves registration at a serving mobile switching center at a registration notification and cancellation at its home mobile switching center. In a third instance of inter-VLR registration, a mobile user roams from a non-home mobile switching center to another non-home mobile switching center. This event involves the registration notification and cancellation at the mobile subscriber's home location register. Each of these events results in additional loading on mobile switching centers in a communication network. Additional details for modeling this additional loading will be set forth in a following section.

The methodology for implementing the rehoming technique of the present invention will subsequently be described. In general, the load balancing methodology of the present invention begins by selecting a mobile switching center in a network that has a highest load. The mobile switching centers having a load lower than a network average load are considered to be candidates for a rehome destination. All other mobile switching centers are not considered at this point. All subscriber groups homed to a highest loaded mobile switching center are considered to be rehomed. For all candidate mobile switching centers and all subscriber groups homed to the highest loaded mobile switching center, a subscriber group is selected and a candidate mobile switching center that gains a highest benefit and gives a lower standard deviation of the load after the rehoming operation is selected. It should be noted that the standard deviation is computed with respect to an average load before the rehoming operation in order to minimize the increase of total load in the network. In each iteration, the methodology of the present invention searches for the best directory number to be rehomed in each candidate mobile switching center. Once the standard deviation of the communication network begins to increase, further rehoming operations may not yield a better balance of loading among elements within that network. As a result, the methodology of the present invention makes use of a pruning mechanism that eliminates further rehome operations from consideration when the standard deviation of loading in the network increases.

Pseudocode for implementing the methodology of the present invention is provided below. It should be noted that implementation and execution of the pseudocode will subsequently be described in greater detail.

Pseudocode for Rehoming Operation

---

Balance_Load ()
compute the average and the standard deviation of load
do
   $f$ = find the MSC which has the higest load
   for each MSC $i$ that has the load lower than averaged load
     for each group $j$ that is homed to $f$
       compute the benefit and standard deviation of rehoming group
       $j$ to $i$ (using equations 8 & 9 subsequently provided)
       update the group $g$ and the MSC $m$ which give minimum
       loading (*standard deviation/benefit*)
     rehome the group $g$ to MSC $m$
     update the load of MSC $m$ and MSC $f$
     recompute the average and standard deviation of the load
until (standard deviation of load increases)

---

The pseudocode described above may be implemented on a data processing system and subsequently used to enable a signalling circuit, such as signalling circuit 200 of FIG. 1, to designate which groups should be rehomed from one mobile switching center to another.

Figure 2:
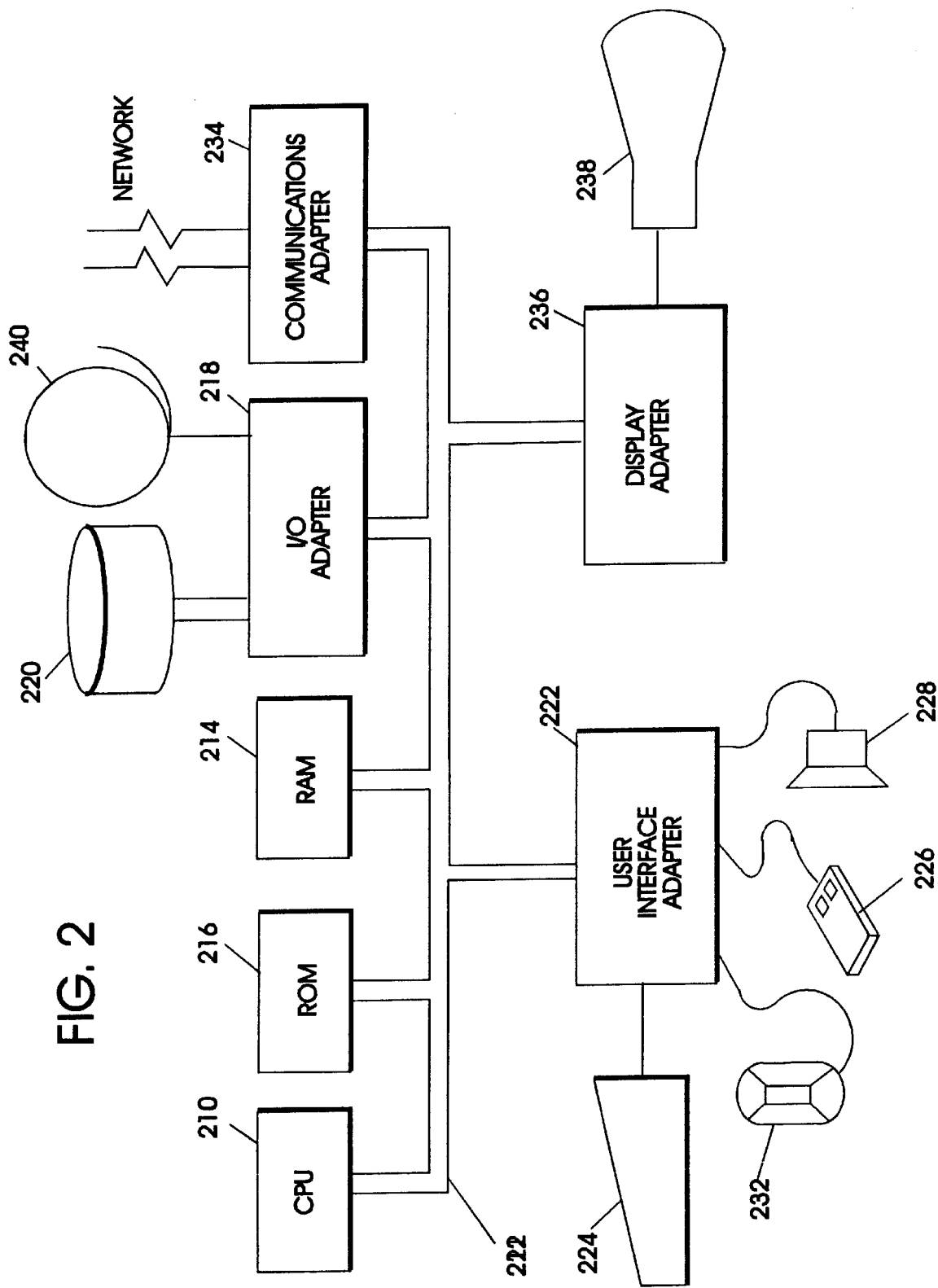
FIG. 2 illustrates, in block diagram form, a data processing system which may implement the present invention.

A typical data processing system which may implement the pseudocode described above is illustrated in FIG. 2. FIG. 2 illustrates an example is shown of a signalling circuit 200 which may be used to implement the present invention. It should be noted that the terms "signalling circuit 200" and "data processing system 200" may be used interchangeably throughout this description. The system has a central processing unit (CPU) 210. A history buffer (not shown) may also be included in CPU 210. CPU 210 is coupled to various other components by a system bus 212. Read only memory ("ROM") 216 is coupled to system bus 212 and includes a basic input/output system ("BIOS") that controls certain basic functions of data processing system 200. Random access memory ("RAM") 214, I/O adapter 218, and communications adapter 234 are also coupled to systems bus 212. I/O adapter 218 may be a small computer system interface ("SCSI") adapter that communicates with a disk storage device 220. Communications adapter 234 interconnects bus 212 with an outside network enabling data processing system 200 to communicate with other said systems. Input/output devices are also connected to system bus 212 via user interface adapter 222 and display adapter 236. Keyboard 224, trackball 232, mouse 226, and speaker 228 are all interconnected to bus 212 via user interface adapter 222. Display monitor 238 is connected to system bus 212 by display adapter 236. In this manner, a user is capable of inputting to the system through the keyboard 224, trackball 232, or mouse 226 and receiving output from the system via speaker 228 and display 238. Additionally, an operating system is used to coordinate the functions of the various components illustrated in FIG. 2.

Preferred implementations of the invention include implementations as a computer system program to execute the method or methods described herein, and or computer program products. According to the computer system implementation, sets of instructions for executing the method or methods arrested in the random access memory 214 of one or more computer systems configured generally is described above. Until acquired by the computer system, the set of instructions may be stored as a computer program product in another computer memory, for example, in disk drive 220 (which may include a removable memory such as an optical disk or a floppy disk for eventual use in disk drive 220). Further, the computer program product can also be stored at another computer and transmitted when desired to the user's workstation by a network or by an external network such as the Internet. One skilled in the art would appreciate that the physical storage of the sets of instructions physically changes the medium upon which it is stored so that the medium carries computer readable information. The change may be electrical, magnetic, chemical, optical, or some other physical change. While it is convenient to describe the invention in terms of instructions, symbols, characters, or the like, the reader should remember that all these and similar terms should be associated with the appropriate physical elements.

Note that the invention describes terms such as comparing, validating, selecting or other terms that could be associated with a human operator. However, for at least a number of the operations described herein which form a part of the present invention. No action by a human operator is desirable. The operations described are, in large part, machine operations processing electrical signals to generate other electrical signals.

Figure 3B:
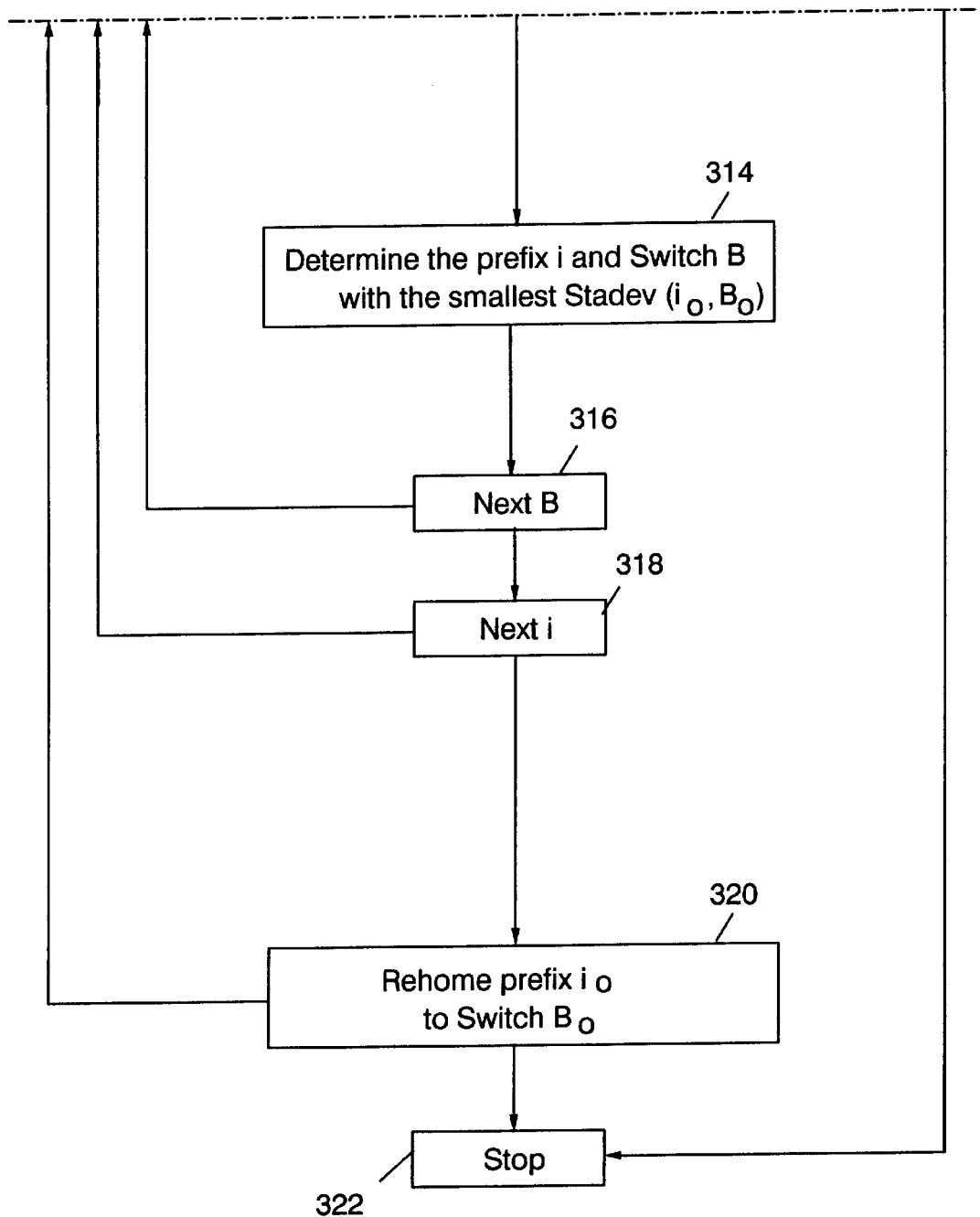
FIG. 3-A illustrates, in flow diagram, a methodology for implementing a load balancing system.

Data processing system 200 implements a methodology illustrated in FIGS. 3-A and 3-B by executing software codes stored in RAM 214 or ROM 216 during the use of central processing unit 210. Such operation and use of memory and central processing units is well-known in the data processing art and will not be described in greater detail herein. In a first step of the methodology illustrated in FIG. 3-A, a mean value is defined as an average load among the mobile switching centers. The average load among the switches is determined by a random measurement of a communication network which is being evaluated. Such random measurements are well-known in the data processing art and are often utilized to capture an amount of usage in any given region by operators of a wireless communications network. Furthermore, a term STADEV is a standard deviation among the switches. The standard deviation is determined to be a difference between a load value on each switch and an average load among all of the switches. Furthermore, when beginning the methodology of the present invention, the term STADEV_PREV is equal to infinity ($\infty$).

In a first step 304, it is determined whether or not the STADEV is greater than or equal to the STADEV_PREV. If the STADEV is not greater than or equal to the STADEV_PREV, a switch A is selected with a highest load in a step 306. Again, when the measurements were taken during a busy or peak time, switch A would have the most mobile subscribers using it. Subsequently, for every prefix which is homed to mobile switching center A, or switch A, the following steps will occur as designated in step 308.

Additionally, for every switch (mobile switching center) B, which has a lower load than the mean load previously determined, the following steps are also executed as specified in step 310. In step 312, the loads among each of the mobile switching centers are calculated if a prefix "i" was moved from a home switch A to another switch B. In a following section, equations for performing this calculation will be outlined and described in greater detail. Next, a prefix "i" and a switch B with the smallest standard deviation are determined. Each of these steps is repeated for each switch in step 316 and each prefix in step 318. After a prefix "i" in switch B are determined to have a smallest STADEV from all of the available switches and available prefixes, the prefix is rehomed to switch B in step 320. Subsequently, operation is considered to be finished in step 322. It should be noted that if, in step 304, the standard deviation had been greater than or equal to the STADEV_PREV, the operations would also consider to be finished and the program flow would return to step 322.

With the growth of subscribers and wireless networks with multiple mobile switching centers, the mobility of subscribers is a significant factor in resource allocation and it is very likely that the real-time loading in multiple mobile switching centers would be unbalanced. The present invention provides an approach to effectively balancing the load of multiple mobile switching centers by rehoming some of the subscribers in a network with a minimum number of rehoming steps. Such balancing increases the total network performance and maximizes existing network capacity. As previously mentioned, such benefits will increase the longevity of the current network before additional equipment is required and will help maximize the return on the operator's investment.

Equations for Modeling Loading of Mobile Switching Centers in a Communications Network The present invention implements the previously described methodology to more efficiently and effectively balance the loading occasioned by mobile telephone users among mobile switching circuits. To determine how mobile switching centers are affected by the movement of a group of telephone users from one mobile switching center to another, the present invention uses a modeling technique which is described below.

Before discussing the following section in greater detail, it is important to note that a mobile user is presumed to have equal probability to roam from a mobile switching center serving area to any adjacent mobile switching center serving area.

Additionally, the following definitions will be used in subsequent discussions:

benefit=amount of load decreased by rehoming subscribers from a mobile switching center;

cost=amount of load increased by rehoming subscribers to a mobile switching center;

totalp=total number of subscribers in a group to be rehomed;

$p_i$=probability that a subscriber in a group appears in an area controlled by a mobile switching center i (in visitor location register i) during a busy hour a=number of mobile termination call attempts per subscriber in a mobile switching center;

b=number of inter-visitor location register registrations per subscriber in a mobile switching center u=real-time cost of call delivery send w=real-time cost of mobile termination call; and v=real-time cost of call delivery received.

Call Related Network Activities

In the following section, call related network activities will be discussed. Call related network activities involve the activity of call delivery sent actions, call delivery received actions, and mobile termination calls actions. Call delivery activity is an activity which delivers a call to a subscriber within the network while the subscriber is travelling outside the area of its home mobile switching center. The call delivery process is initiated at an originating mobile switching center, which is usually the home mobile switching center. Hence, the originating mobile switching center has to send a call to a mobile switching center that it is currently serving the subscriber, while the current serving mobile switching center of the subscriber has to receive the call. This operation is illustrated in greater detail in FIG. 4.

Figure 4:
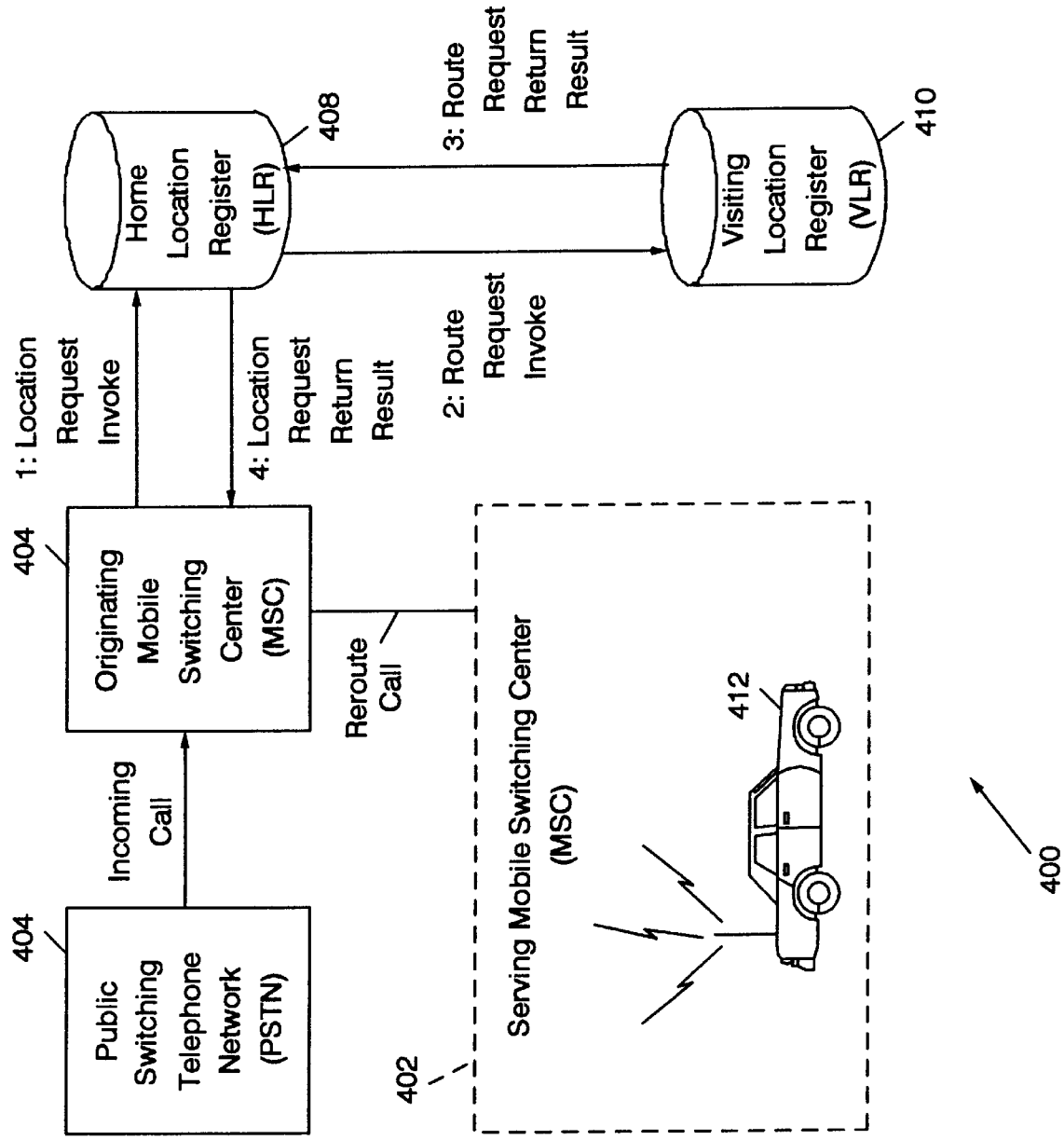
FIG. 4 illustrates, in block diagram form, a wireless communications network in which an incoming call is provided by a public switch telephone network.

In FIG. 4, assume that public switched telephone network (PSTN) 404 sends an incoming call to originating mobile switching center 406. Originating mobile switching center 406 must then send a location request invoke signal (1) to a home location register 408. HLR 408 submits a route request invoke signal to visiting location register (VLR) 410. In response to the route request invoke signal, VLR 410 sends a route request return result to HLR 408. The route request return result indicates whether the mobile subscriber is registered with VLR 410. HLR 408 subsequently provides a location request return result to originating mobile switching center 406. In response to the location request return result signal provided by HLR 408, originating mobile switching center 406 provides a reroute call signal to a serving mobile switching center 402. Serving mobile switching center 402 subsequently receives the call sent by originating mobile switching center 406 and, the subscriber then receives an incoming telephone call.

As may be seen from the example illustrated in FIG. 4, such call related activities significantly load the home, or originating, mobile switching center and a serving mobile switching center 402 of the wireless communications network. For example, MSC 406 is loaded when it sends the location request invoke signal (1) to HLR 408. Upon a determination by HLR 408 and VLR 410 as to whether or not the mobile user is within an area covered by originating MSC 406, originating MSC 406 must provide the reroute call signal to serving MSC 402. The provision and routing of each of these calls and requests significantly loads each MSC, both originating MSC 406 and serving MSC 402.

It should also be noted that call related network activities include mobile terminating calls which are calls wherein the subscriber of a wireless network is called and the subscribers appear in an area served by their home mobile switching center. Such activities also increase loading on the affected mobile switching centers.

To determine an impact of rehoming on the loading of home mobile switching centers and serving mobile switching centers, the benefit must be evaluated. To evaluate this benefit, assume that by moving subscribers in a group from their home mobile switching center (MSCf) to another mobile switching center (MSCt), the load of MSCf is decreased by benefit1, which is given as follows:

$$\text{benefit1} = \text{totalp} \times a \times [(1-p_f) \times u + (p_f \times w) - (p_f \times v)]. \quad (1)$$

In equation (1), $p_f$ is a probability that a subscriber in a group appears in an area controlled by MSCf. Additionally, first term, totalp x a x $(1-p_f)$, indicates an amount of loading on MSC$f$ due to call delivery send activity. The second term, total$f$ x a x $p_f$x w, indicates an amount of loading on MSC$f$ resulting from mobile termination call activity. The last term, totalp x a x $p_f$x v, indicates an amount of loading on MSC$f$ due to call delivery received activity.

Similarly, the load of MSCt may also be calculated using the equation (2).

$$\text{cost1} = \text{totalp} \, x \, a \, x[(1-p_t)x \, u + (p_t x \, w) - (p_t x \, v)]. \tag{2}$$

In equation (2), $p_t$ is a probability that a subscriber in a group appears in an area controlled by MSCt. Additionally, first term totalp x a x $(1-p_t)$ x u, indicates an amount of loading on MSCt due to call delivery send activity. The second term, total$f$ x a x $p_t$ x w, indicates an amount of loading on MSCt resulting from mobile termination call activity. The last term, totalp x a x $p_t$ x v, indicates an amount of loading on MSCt due to call delivery received activity.

To calculate each of the variables used in equation 1, well-known techniques may be utilized. For example, a, a number of mobile termination call attempts per subscriber in a mobile switching center, may be easily determined through well-known calculation techniques. Additionally, u, a real-time cost of call delivery send actions, w, a real-time cost of mobile termination call actions, and v, a real-time cost of call delivery received actions, are calculated by wireless communication network administrators using well-known techniques. Furthermore, a probability, such as $p_f$ and $p_t$ may also be calculated using well-known techniques.

Whenever a mobile subscriber roams from one area served by a mobile switching center to another area served by another mobile switching center, inter-VLR registration will occur. Such a registration includes a sequence of steps taken to inform the mobile switching center of the identity and location of the mobile subscriber currently active in the mobile switching centers coverage, or serving area.

Inter-Visitor Location Register Activities

Figure 5:
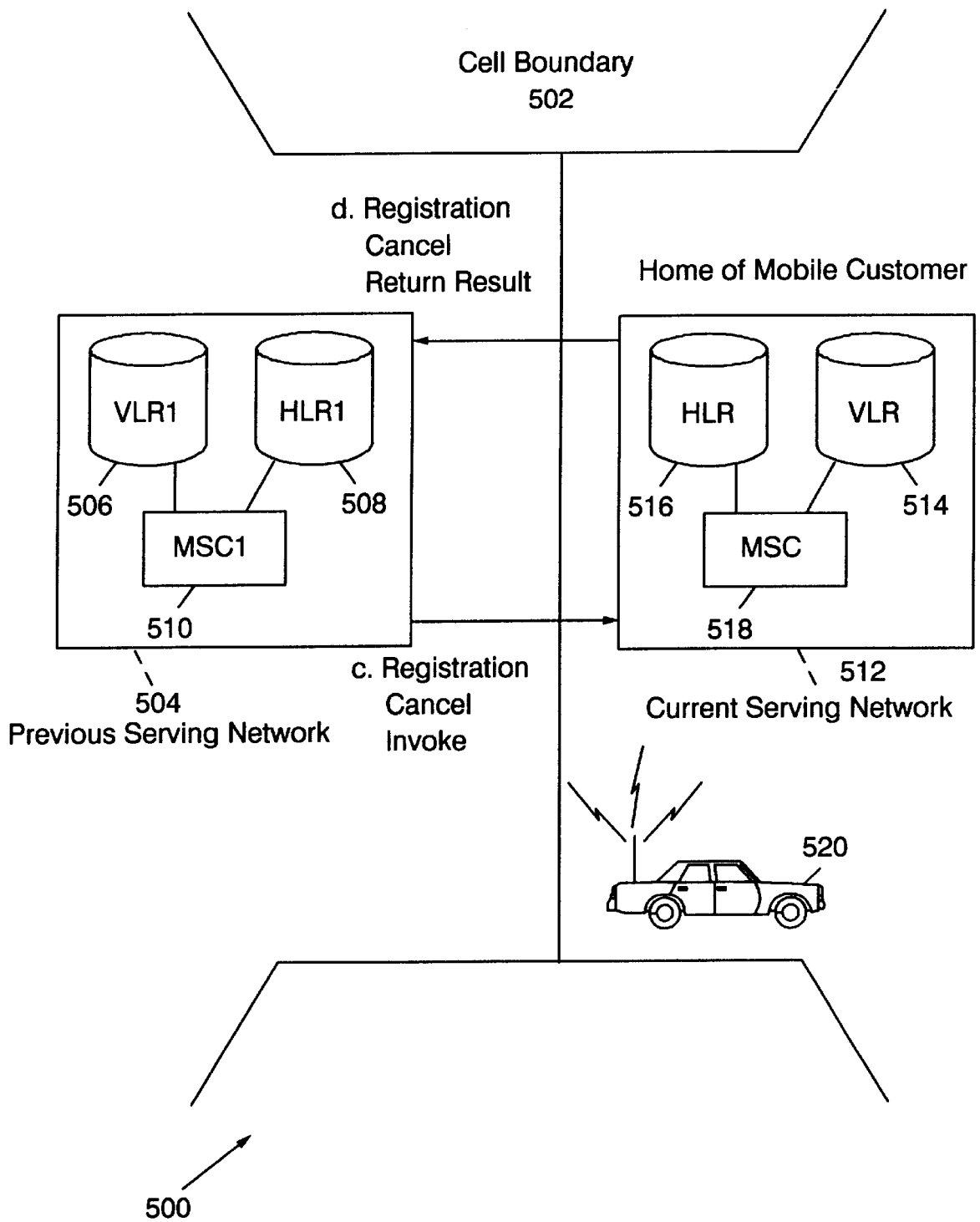
FIG. 5 illustrates, in block diagram form, a first example of a communication operation within a wireless communications network.

FIG. 5 illustrates a first case of inter-VLR registration wherein a mobile subscriber roams from a non-home mobile switching center (MSC) to its home mobile switching center (MSC). Assume that "$x_i$" is a real-time cost on MSC 512 to register mobile subscriber 520 at its home MSC and "$x_2$" is the real-time cost on a previous serving network 504 for subscriber 520. The relative costs and benefits for rehoming a mobile user from a previous serving network to a home network will subsequently be discussed. During that discussion, the term "MSC$_f$" will be used to refer to a home MSC to which a mobile user is originally homed, the term "MSCt" refers to a MSC to which the mobile user is rehomed and is currently using, and the term "MSCt" refers to a previous serving MSC.

When a group of subscribers is rehomed from MSC$f$ 504 to another switch, a benefit to the load on MSC$f$ is:

$$\text{benefit2} = \text{totalp} \times b \times \left[ (p_f \times x_1) - \sum_{i \in adj \, (i)} \frac{p_f}{\sum_{i \in adj \, (i)} p_j} \times p_i \times x_2 \right], \tag{3}$$

Furthermore, since MSC$f$ is no longer the home MSC to the rehomed group of subscribers (the number of subscribers is totalp), MSC$f$ is not responsible for the inter-VLR registrations of subscribers moving to MSC$f$. The first term, totalp x $p_f$x b x $x_1$, indicates the benefit to MSC$f$ resulting from MSC$f$ not being responsible for the inter-VLR registrations.

As well, MSC$f$ is "charged" for registration cancellation when subscribers in the rehomed group move out of the service area of MSC$f$ and MSC$f$ is no longer the home MSC to the group of subscribers after a rehoming operation. The second term in equation (3) gives an amount by which a load increases on MSC$f$ due to registration cancellations. In equation (3), $$\left( \frac{p_f}{\sum_{i \in adj \, (i)} p_j} \right) \times p_i$$

represents a probability of a subscriber in the rehomed group moving from MSC$f$ to another switch MSCi which is adjacent to MSC$f$. Furthermore, $$\text{totalp} \times b \times \frac{p_f}{\sum_{i \in adj \, (i)} p_j} \times p_i \times x_2$$

is the cost related to registration cancellations resulting from a movement of subscribers from MSC$f$ to MSCi due to the rehoming operation.

The cost on MSCt related to the first case inter-VLR registration due to rehoming a group of subscribers to MSCt is:

$$\text{cost2} = \text{totalp} \times b \times \left[ (p_f \times x_1) - \sum_{i \in adj \, (t) \, i \in adj \, (i)} \frac{p_f}{\sum p_j} \times p_i \times x_2 \right], \tag{4}$$

As in equation (3), a first term of equation (4) indicates a cost increase on MSCt related to inter-VLR registration notifications due to a group of subscribers being rehomed to MSCt. A second term of equation (4) represents a cost decrease on MSCt related to registration cancellations, because MSCt should no longer be charged for registration cancellations when subscribers move to MSCt and MSCt becomes their home switch after a rehoming operation.

Figure 6:
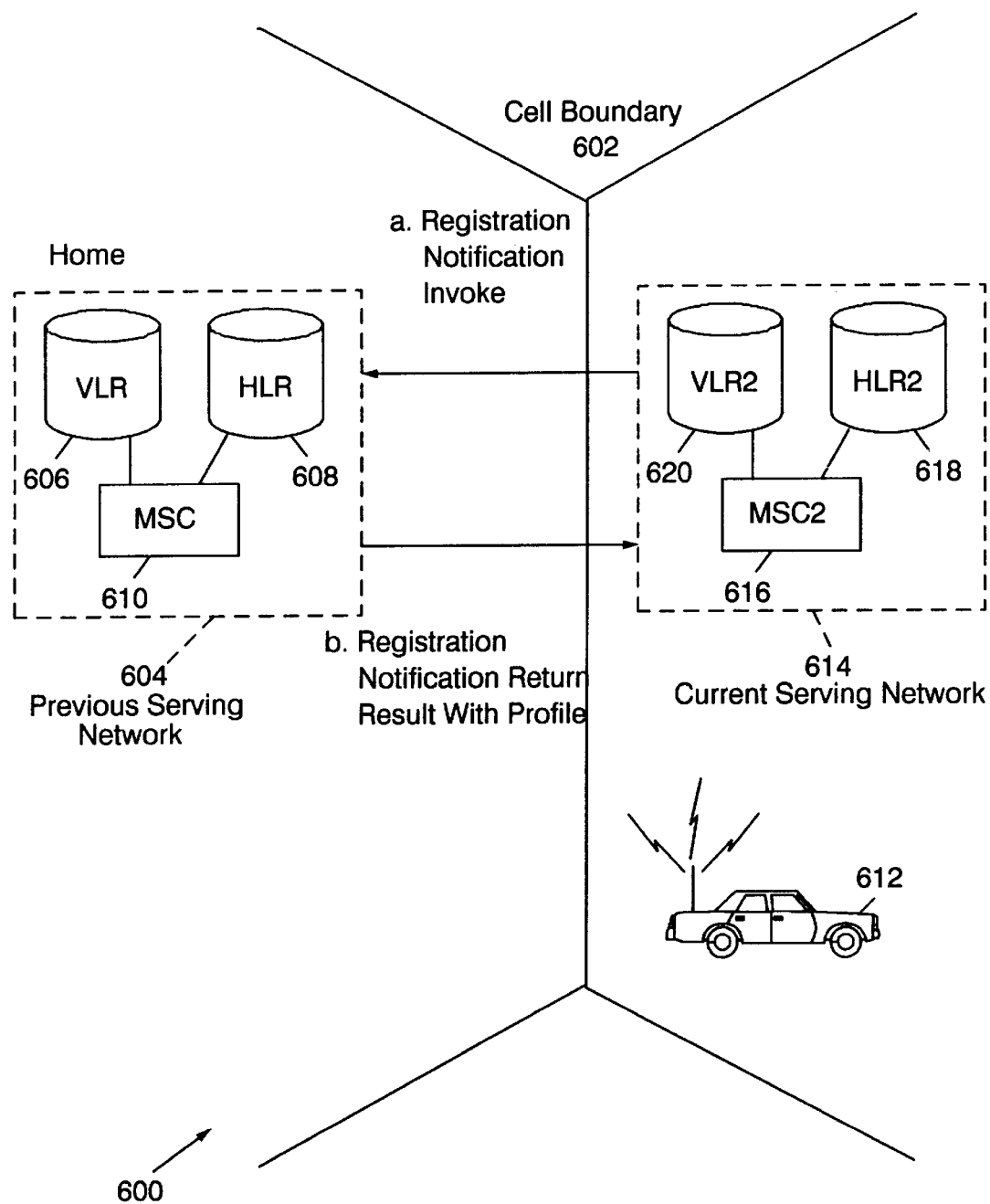
FIG. 6 illustrates, in block diagram form, a second example of a communication operation in a wireless communications network.

Additionally, consider a second case of inter-VLR registration wherein a mobile subscriber roams from its home MSC to a non-home MSC. Such a situation is illustrated in FIG. 6. In FIG. 6, assume that "$x_3$" is the real-time cost to the mobile subscriber 612 at current serving area 614 and "$x_4$" represents the real-time cost on MSC 610 to notify and cancel a registration at a home MSC 610. As in FIG. 5, the term "MSC$f$" corresponds to an original home MSC for a mobile user and the term "MSCt" corresponds to a service to which the mobile user was rehomed.

Similar to the analysis of equation (3), the load decrease on MSC$f$ is:

$$\text{benefit3} = \text{totalp} \times b \times \left[ \left( \sum_{i \in adj \, (f) \, i \in adj \, (i)} \frac{p_f}{\sum p_j} \times p_i \times x_4 \right) - (p_f \times x_3) \right], \tag{5}$$

In equation (5), a first term indicates a reduction in an amount of loading related to registration notification and cancellation on a MSC since MSC$f$ is no longer a home MSC to the group of mobile users after a rehoming operation is performed. Furthermore, since MSC$f$ is no longer the home MSC to the rehomed group of mobile users, MSC$f$ should be charged for "$x_3$" costs when subscribers in that group move from their new MSC to MSC$f$. It should be noted that the number of those subscribers is equal to totalp x $p_f$. The second term of equation (5) indicates the cost increase on MSC$f$ for the reasons described above.

Correspondingly, the load increase on MSCt to which a group of mobile users is rehomed is:

$$cost3 = totalp \times b \times \left[ \sum_{i \in adj\,(t)} \frac{p_f}{\sum_{i \in adj\,(i)} p_j} \right] \times p_i \times x_4 - (p_t \times x_3) \quad (6)$$

Figure 7:
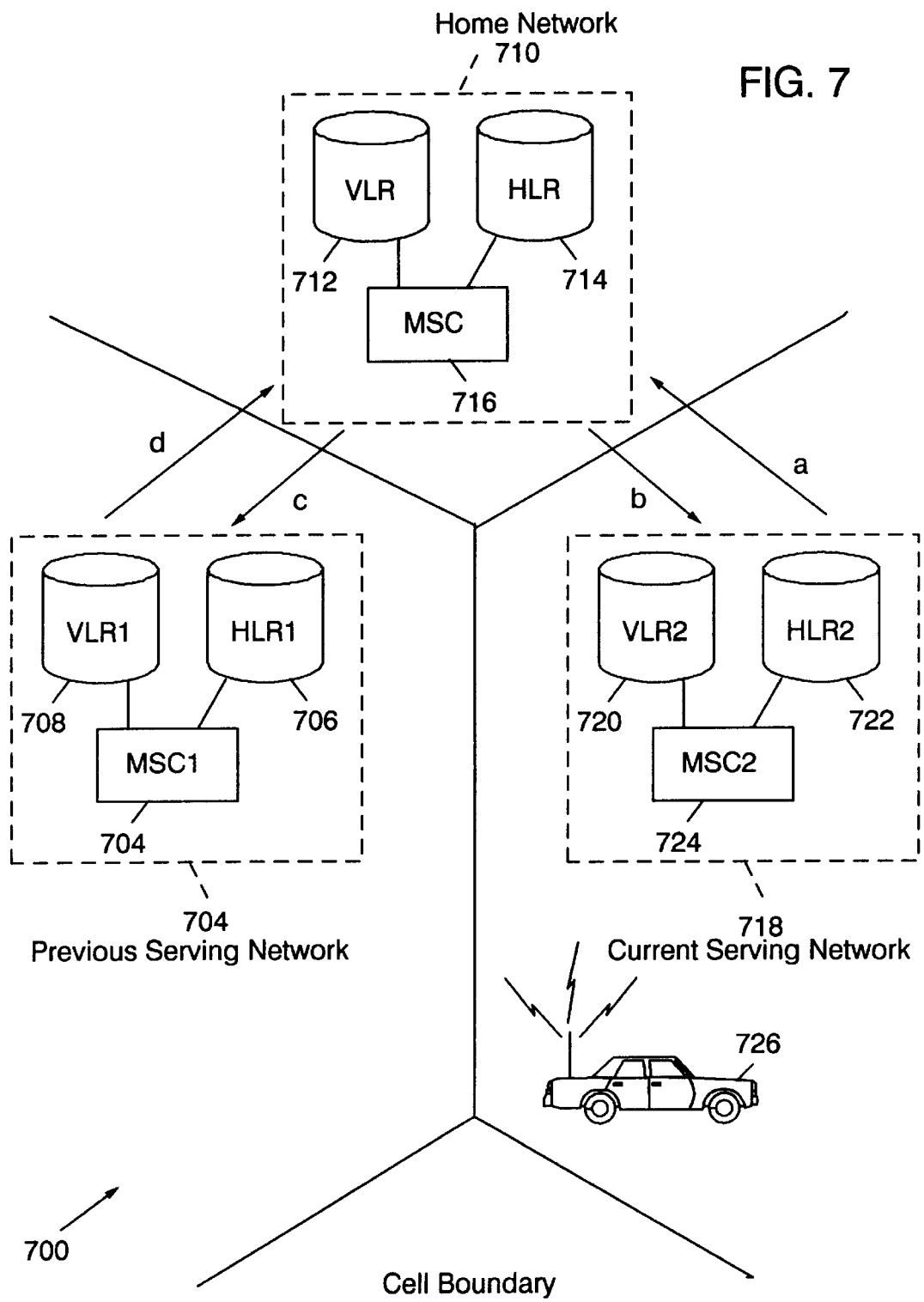
FIG. 7 illustrates, in block diagram form, a third example of a communication operation in a wireless communications network.

Finally, consider a third case of inter-VLR registration wherein a mobile subscriber roams from a non-home MSC to another non-home MSC. Assume that "$x_5$" is the real-time cost to notify and cancel a registration at a home MSC 716, as illustrated in FIG. 7. In the following equations, note that the term MSC$f$ refers to a home MSC, the term MSC$i$ refers to a current serving network, and the term MSC$j$ refers to a previous serving network. When a group of subscribers to MSC$f$ is rehomed to MSC$t$, the benefit to the load of MSC$f$ is:

$$benefit4 = totalp \times b \times \sum_{\forall i \neq f} \left( p_i \times \frac{\sum_{j \in adj\,(i), j \neq f} p_j}{\sum_{i \in adj\,(i)} p_l} \right) \times x_5, \quad (7)$$

In equation (7), the term $$p_i \times \frac{\sum_{j \in adj\,(i), j \neq f} p_j}{\sum_{i \in adj\,(i)} p_l}$$

represents the probability of a subscriber of a group moving to MSC$i$ from all adjacent MSCs, except for MSC$f$. After the rehoming of the group from MSC$f$ to MSC$t$, MSC$f$ is no longer "in charge" of these registration costs. Rather, MSC$t$ becomes responsible for these costs. Thus, the cost increase on MSC$t$ should be:

$$cost4 = totalp \times b \times \sum_{\forall i \neq f} \left[ p_i \times \frac{\sum_{j \in adj\,(i), j \neq f} p_j}{\sum_{i \in adj\,(i)} p_l} \right] \times x_5. \quad (8)$$

Calculation of Rehoming Benefits and Costs

As indicated above, by rehoming subscribers of a directory number from their home mobile switching center to any other mobile switching center, the load of a home mobile switching center is decreased by a benefit value, which is defined as:

Similarly, the load of a destination mobile switching center may be increased by a cost calculated as follows:

$$benefit = benefit1 + benefit2 + benefit3 + benefit4; \text{ or} \quad (9)$$
$$= totalp \times a \times [(1 - p_f) \times u + (p_f \times w) - (p_f \times v)] +$$
$$totalp \times b \times p_f \times (x_1 - x_3)$$

$$totalp \times b \times \left( \sum_{\forall i \neq f} \frac{p_f}{\sum_{i \in adj\,(i)} p_j} \times p_i \right) \times (x_4 - x_2)$$

$$totalp \times b \times \left[ \sum_{\forall i \neq f} p_i \times \frac{\sum_{j \in adj\,(i), j \neq t} p_j}{\sum_{i \in adj\,(i)} p_l} \right] \times x_5.$$

$$cost = cost1 + cost2 + cost3 + cost4; \text{ or} \quad (10)$$
$$cost = totalp \times a \times [(1 - p_t) \times u + (p_t \times w) - (p_t \times v)] +$$

$$totalp \times b \times \left[ (p_t \times x_1) = \sum_{i \in adj\,(t)} \frac{p_t}{\sum_{i \in adj\,(i)} p_j} \times p_i \times x_2 \right] +$$

$$totalp \times b \times \left[ \sum_{i \in adj\,(t)} \frac{p_t}{\sum_{i \in adj\,(i)} p_j} \times p_i \times x_4 - (p_t \times x_3) \right] +$$

$$totalp \times b \times \sum_{\forall i \neq t} p_i \times \left[ \sum_{i \in adj\,(i), j \neq t} \frac{p_j}{\sum_{i \in adj\,(i)} p_l} \right] \times x_5.$$

Equations for calculating loads and costs associated with the movement of mobile subscribers within a cellular network are provided above. By using these equations to calculate loads, costs, and benefits associated with the movement of a group of mobile subscribers from one mobile switching center to another, the loading on each mobile switching center within a wireless communication network may be balanced in an effective and efficient manner. Therefore, these equations may be used to increase the capacity of a cellular network by providing a means to balance the loads of mobile switching centers so that all mobile switching centers are used in a manner which maximizes their capacity. The present invention utilizes the equations described above to determine a minimum number of rehoming steps required to minimize the standard deviation of the loads in the mobile switching centers of a cellular network. Furthermore, in the present invention, the mobility of subscribers is considered through the benefit and cost functions of equations (8) and (9). By using these equations to calculate a resultant benefit of a movement of users on a mobile switching network, the standard deviation of the load in the network may be calculated and used to achieve load balance. Additionally, by performing rehoming operations with the highest benefit and lowest standard deviation, a methodology of the present invention minimizes a number of rehoming steps.

Conclusion

From the description provided above, it is evident that the present invention provides a methodology for balancing loading among multiple mobile switching centers in a wireless communication network. The methodology of the present invention utilizes the equations described above to execute the steps outlined above to accurately perform a load balancing operation which accounts for multiple, mobile subscribers within the wireless communication network. Stated another way, during execution of this load balancing methodology, a rehoming operation is execution at a telephone central office or data processing system to move some subscribers in a network to a new home mobile switching center with a minimum number of rehoming steps. As previously described, to perform this rehoming operation, a mobile switching center in a network which has the highest load is selected first. Mobile switching centers which have a load lower than a network average load are considered to be candidates for a rehome destination. Subsequently, all subscriber groups homed to the highest loaded mobile switching center are evaluated to determine whether or not a rehoming operation using this subscriber group will provide a highest benefit and give a lowest standard deviation of loads among all of the mobile switching centers in the communication network. The operation of the present invention is iterative and searches for the best directory, or group of telephone users, to be rehomed in each candidate mobile switching center. A resulting balanced load of network resources serves to increase the effectiveness and longevity of the current wireless communication network before additional equipment is required.

While there have been described herein the principles of the invention, it is to be clearly understood to those skilled in the art that this description is made by way of example only and not as a limited to the scope of the invention. Accordingly, it is intended, by the appended claims, to cover all modifications of the invention which fall within the true spirit and scope of the invention.

What is claimed is:

1. A method in a processing unit for controlling and allocating control of call processing in a communication network, by controlling a number of operations to be performed by each of a plurality of data processors, comprising the steps of:

i. calculating an average number of operations to be performed by each of the plurality of data processors;

ii. calculating a standard deviation between the number of operations to be performed by each of the plurality of data processors and the average number of operations to be performed by each of the plurality of data processors;

iii. selecting a first data processor which performs a highest number of operations;

iv. selecting a first one of a plurality of groups of a plurality of devices assigned to the first data processor;

v. assigning the first one of the plurality of groups of the plurality of devices to a second data processor;

vi. routing the first one of the plurality of groups of the plurality of devices to the second data processor;

vii. calculating a standard deviation between the number of operations to be performed by each of the plurality of data processors after the first one of the plurality of groups is assigned to the second data processor and the average number of operations to be performed by each of the plurality of data processors;

viii. repeating steps iv. through vii. for each of the plurality of groups of the plurality of devices assigned to the first data processor; and ix. identifying a selected one of the plurality of groups which results in a lowest standard deviation between the number of operations to be performed by each of the plurality of data processors and the average number of operations to be performed by each of the plurality of data processors with reference to information obtained in steps vii. or viii.

2. The method of claim 1 wherein the second data processor performs fewer operations than the average number of operations to be performed by each of the plurality of data processors.

3. The method of claim 1 wherein the plurality of data processors is a plurality of mobile switching circuits and each of the plurality of data processors is a mobile switching circuit in a wireless communications network.

4. The method of claim 3 wherein each of the plurality of devices is a mobile telephone.

5. The method of claim 4 wherein each of the plurality of groups is a plurality of mobile telephones using a same prefix.

6. The method of claim 5, further comprising the step of:

calculating the number of operations performed by the each of the plurality of mobile switching circuits using a benefit calculation:

$$\text{benefit} = totalp \times a \times [(1 - p_f) \times u + (p_f \times w) - (p_f \times v)] + \quad (11)$$

$$totalp \times b \times \left[ (p_f \times x_1) - \sum_{i \in adj\,(f)} \frac{p_f}{\sum_{i \in adj\,(i)} p_j} \times p_i \times x_2 \right] +$$

$$totalp \times b \times \left[ \sum_{i \in adj\,(f)} \frac{p_f}{\sum_{i \in adj\,(i)} p_j} \times p_i \times x_4 - (p_f \times x_3) \right] +$$

$$totalp \times b \times \sum_{\forall i \neq t} p_i \times \left[ \sum_{i \in adj\,(i), j \neq t} \frac{p_j}{\sum_{i \in adj\,(i)} p_l} \right] \times x_5.$$

7. The method of claim 1 wherein the step of calculating the average number of operations to be performed by each of the plurality of data processors comprises the step of:

randomly measuring the number of operations performed by each of the plurality of data processors in a preselected time period.

8. A data processing system for controlling and allocating control of call processing in a telecommunication network, comprising:

a memory for storing a software program;

a central processing unit coupled to the memory for accessing the software program, the central processing unit controlling and allocating control of a group of mobile telephone users in a communication network to be moved from a first mobile switching center to a second mobile switching center in response to the software program, the central processing unit comprising:

means for calculating an average load of each of a plurality of mobile switching centers in the communication network;

means for calculating a standard deviation between the load of each of the plurality of mobile switching centers and the average load of the plurality of mobile switching centers;

means for selecting a first mobile switching center which has a highest load;

means for selecting a first one of a plurality of mobile telephone users assigned to the first mobile switching center;

means for selectively, consecutively assigning the first one of the plurality of mobile telephone users to each of a remaining portion of the plurality of mobile switching centers;

means for routing the selected first one of a plurality of mobile telephone users to each of the remaining portion of the plurality of mobile switching centers;

means for calculating a load of each of the plurality of mobile switching centers after the first one of the plurality of mobile telephone users is assigned to each of the remaining portion of the plurality of mobile switching centers;

means for consecutively calculating a standard deviation between the load of each of the plurality of mobile switching centers after the first one of the plurality of mobile telephone users is assigned to each of the remaining portion of the plurality of mobile switching centers and the average load of the plurality of mobile switching centers; and means for identifying a selected one of the plurality of mobile telephone users which results in a lowest standard deviation between the calculated load of each of the plurality of mobile switching centers and the average load of each of the plurality of mobile switching centers.

9. The data processing system of claim 8, wherein the central processing unit further comprises:

means for assigning the selected one of the plurality of mobile telephone users to the second mobile switching center.

10. The data processing system of claim 8, wherein the central processing unit further comprises:

means for selectively, consecutively assigning a second one of the plurality of mobile telephone users to each of a remaining portion of the plurality of mobile switching centers.

11. The data processing system of claim 10 wherein the means for consecutively calculating the load of each of the plurality of mobile switching centers calculates the load after the second one of the plurality of mobile telephone users is assigned to each of the remaining portion of the plurality of mobile switching centers.

12. The data processing system of claim 11 wherein the means for consecutively calculating the standard deviation calculates the standard deviation between the load of each of the plurality of mobile switching centers after the second one of the plurality of mobile telephone users is assigned to each of the remaining portion of the plurality of mobile switching centers and the average load of the plurality of mobile switching centers.

13. A program storage device readable by a machine, tangibly embodying a program of instructions executable by the machine to perform method steps for balancing a number of operations to be performed by each of a plurality of data processors, said method steps comprising:

i. calculating an average number of operations to be performed by each of the plurality of data processors;

ii. calculating a standard deviation between the number of operations to be performed by each of the plurality of data processors and the average number of operations to be performed by each of the plurality of data processors;

iii. selecting a first data processor which performs a highest number of operations;

iv. selecting a first one of a plurality of groups of a plurality of devices assigned to the first data processor;

v. assigning the first one of the plurality of groups of the plurality of devices to a second data processor;

vi. calculating a standard deviation between the number of operations to be performed by each of the plurality of data processors after the first one of the plurality of groups is assigned to the second data processor and the average number of operations to be performed by each of the plurality of data processors;

vii. repeating steps iv. through vi. for each of the plurality of groups of the plurality of devices assigned to the first data processor; and viii. identifying a selected one of the plurality of groups which results in a lowest standard deviation between the number of operations to be performed by each of the plurality of data processors and the average number of operations to be performed by each of the plurality of data processors with reference to information obtained in steps vi. or vii.

14. A program storage device readable by a machine, tangibly embodying a program of instructions executable by the machine to perform method steps for balancing a load of each of a plurality of mobile switching centers in a communication network, said method steps comprising:

i. computing an average load for each of the plurality of mobile switching centers;

ii. computing a standard deviation between an actual load of each of the plurality of mobile switching centers and the average load for each of the plurality of mobile switching centers;

iii. determining a first one of the plurality of mobile switching centers having a highest load;

iv. identifying a group of mobile telephone users assigned to the first one of the plurality of mobile switching centers;

v. computing a benefit amount by which the highest load would be reduced if the group of mobile telephone users were reassigned to a selected one of a remaining portion of the plurality of mobile switching centers;

vi. computing the standard deviation which would result if the group of mobile telephone users were reassigned to the selected one of the remaining portion of the plurality of mobile switching centers; and vii. repeating steps iv. through vi. for each of a plurality of groups of mobile telephone users.

15. The program storage device of claim 14, tangibly embodying the program of instructions executable by the machine to perform method steps for balancing the load of each of the plurality of mobile switching centers in a communication network, said method steps further comprising:

viii. reassigning the group of mobile telephone users to the selected one of the remaining portion of the plurality of mobile switching centers when the standard deviation among the loads of each of the plurality of mobile switching centers is reduced.

16. The program storage device of claim 14, tangibly embodying the program of instructions executable by the machine to perform method steps for balancing the load of each of the plurality of mobile switching centers in a communication network, said method steps further comprising:

viii. repeating steps iv. through vii. for each of a plurality of mobile switching centers.

17. The program storage device of claim 16, tangibly embodying the program of instructions executable by the machine to perform method steps for balancing the load of each of the plurality of mobile switching centers in a communication network, said method steps further comprising:

ix. reassigning a selected group of mobile telephone users to a selected one of the remaining portion of the plurality of mobile switching centers when the standard deviation among the loads of each of the plurality of mobile switching centers is reduced.

18. A method in a processing unit for controlling and allocating control of call processing in a communication network by controlling a load of each of a plurality of mobile switching centers, comprising the steps of:

i. computing an average load for each of the plurality of mobile switching centers;

ii. computing a standard deviation between an actual load of each of the plurality of mobile switching centers and the average load for each of the plurality of mobile switching centers;

iii. determining a first one of the plurality of mobile switching centers having a highest load;

iv. identifying a group of mobile telephone users assigned to the first one of the plurality of mobile switching centers;

v. computing a benefit amount by which the highest load would be reduced if the group of mobile telephone users were reassigned to a selected one of a remaining portion of the plurality of mobile switching centers;

vi. computing the standard deviation which would result if the group of mobile telephone users were reassigned to the selected one of the remaining portion of the plurality of mobile switching centers;

vii. repeating steps iv. through vi. for each of a plurality of groups of mobile telephone users;

viii. reassigning the group of mobile telephone users to the selected one of the remaining portion of the plurality of mobile switching centers when the standard deviation among the loads of each of the plurality of mobile switching centers is reduced; and ix. routing the group of mobile telephone users assigned to the first one of the plurality of mobile switching centers to the selected one of the remaining portion of the plurality of mobile switching centers.

19. The method of claim 18 further comprising the step of:

x. repeating steps iv. through ix. for each of the plurality of mobile switching centers.

20. The method of claim 19, further comprising the step of:

xii. reassigning a selected group of mobile telephone users to a selected one of the remaining portion of the plurality of mobile switching centers when the standard deviation among the loads of each of the plurality of mobile switching centers is reduced.

21. A method in a processing unit for controlling and allocating control of call processing in a communication network by rehoming a group of mobile telephone users, comprising the steps of:

i. computing an average load for each of a plurality of mobile switching centers in the communication network;

ii. determining a first one of the plurality of mobile switching centers having a highest load;

iii. identifying each of a plurality of groups of mobile telephone users in the communication system assigned to the first one of a plurality of mobile switching centers;

iv. computing a benefit amount by which the highest load would be reduced when a selected one of the plurality of groups of mobile telephone users is reassigned to a selected one of a remaining portion of the plurality of mobile switching centers;

v. computing a standard deviation which would result when the selected one of the plurality of groups of mobile telephone users is reassigned to the selected one of the remaining portion of the plurality of mobile switching centers;

vi. repeating steps iv. and v. for each of the plurality of groups of mobile telephone users;

vii. repeating steps iv. and vi. for each of the remaining portion of the plurality of mobile switching centers;

viii. determining a lowest standard deviation for each of the plurality of groups of mobile telephone users and each of the remaining portion of the plurality of mobile switching centers; and reassigning the group of mobile telephone users associated with the lowest standard deviation to the selected one of the remaining portion of the plurality of mobile switching centers; and ix. routing the group of mobile users to the selected one of the remaining portion of the plurality of mobile switching centers in accordance with the reassignment of step viii.

22. A computer program product for controlling and allocating control of call processing in a communication network using a data processing system which is integrated into the network, the computer program product having a medium with a computer program embodied thereon, the computer program comprising:

i. computer program code for requesting and receiving a number of operations performed by each of a plurality of data processors;

ii. computer program code for determining an average number of operations to be performed by each of the plurality of data processors;

iii. computer program code for determining a standard deviation between the number of operations to be performed by each of the plurality of data processors and the average number of operations to be performed by each of the plurality of data processors;

iv. computer program code for determining and selecting a first data processor which performs a highest number of operations within the communication network;

v. computer program code for determining and selecting a first one of a plurality of groups of a plurality of devices assigned to the first data processor;

vi. computer program code for routing the first one of the plurality of groups of the plurality of devices to a second data processor;

vii. computer program code for determining a standard deviation between the number of operations to be performed by each of the plurality of data processors after the first one of the plurality of groups is assigned to the second data processor and the average number of operations to be performed by each of the plurality of data processors;

viii. computer program code for iteratively performing computer program codes v. through vii. for each of the plurality of groups of the plurality of devices assigned to the first data processor; and ix. computer program code for determining a selected one of the plurality of groups which results in a lowest standard deviation between the number of operations to be performed by each of the plurality of data processors and the average number of operations to be performed by each of the plurality of data processors.

23. A computer program product in accordance with claim 22 wherein the plurality of data processors is a plurality of mobile switching circuits and each of the plurality of data processors is a mobile switching circuit in a wireless communications network.

24. A computer program product in accordance with claim 23 wherein each of the plurality of devices is a mobile telephone.

25. A computer program product in accordance with claim 24 wherein each of the plurality of groups is a plurality of mobile telephones using a same prefix.

26. A computer program product in accordance with claim 25 wherein number of operations performed by the each of the plurality of mobile switching circuits is determined by using a benefit calculation:

$$\text{benefit} = totalp \times a \times [(1-p_f) \times u + (p_f \times w) - (p_f \times v)] +$$

$$totalp \times b \times \left[(p_f \times x_1) - \sum_{i \in adj(f)} \frac{p_f}{\sum_{i \in adj(f)} p_j} \times (p_i \times x_2)\right] +$$

$$totalp \times b \times \left[\sum_{i \in adj(f)} \frac{p_f}{\sum_{i \in adj(f)} p_j} \times p_i \times x_4 - (p_f \times x_3)\right] +$$

$$totalp \times b \times \sum_{\forall i \neq t} p_i \times \left[\sum_{i \in adj(i), j \neq t} \frac{p_j}{\sum_{i \in adj(i)} p_i}\right] \times x_5.$$

27. A computer program product in accordance with claim 22 wherein the average number of operations to be performed by each of the plurality of data processors is determined by randomly measuring the number of operation performed by each of the plurality of data processors in a preselected time period.

* * * * *

UNITED STATES PATENT AND TRADEMARK OFFICE
CERTIFICATE OF CORRECTION

PATENT NO. : 6,055,433  
DATED : April 25, 2000  
INVENTOR(S) : Yuan, et al.

Page 1 of 11

It is certified that error appears in the above-identified patent and that said Letters Patent is hereby corrected as shown below:

Column 3, line 10   Delete "centers"  
Insert --center--

Column 7, line 29   Delete "higest"  
Insert --highest--

Column 10, line 63   Delete "benefit1=totalpxax[(1-$p_j$)xu+($p_j$xw)-($p_j$xv)].   (1)"  
Insert --$benefit1 = totalp \times a \times [(1-p_j) \times u + (p_f \times w) - (p_f \times v)]$.   (1)--

Column 11, line 9   Delete "cost1=totalp $x$ $a$ $x$[(1-$p_i$)$x$ $u$+($p_i x$ w)-($p_i x$ v)].   (2)"  
Insert --$cost1 = totalp \times a \times [(1 - p_i) \times u + (p_i \times w) - (p_i \times v)]$.   (2)--

Column 11, line 55   Delete $$"benefit2 = totalp \times b \times \left[ (p_f \times x_1) - \sum_{i \in adj(i)} \frac{p_f}{\sum_{i \in adj(i)} p_j} \times p_i \times x_2 \right], \quad (3)"$$

Insert $$-- benefit2 = totalp \times b \times \left[ (p_f \times x_1) - \sum_{i \in adj(f)} \frac{p_f}{\sum_{j \in adj(i)} p_j} \times p_i \times x_2 \right], \quad (3)--$$

UNITED STATES PATENT AND TRADEMARK OFFICE
CERTIFICATE OF CORRECTION

PATENT NO. : 6,055,433
DATED : April 25, 2000
INVENTOR(S) : Yuan, et al.

It is certified that error appears in the above-identified patent and that said Letters Patent is hereby corrected as shown below:

Column 12, line 6    Delete " $\left( \dfrac{p_f}{\sum_{i \in adj(i)} p_j} \right) \times p_i$ " and insert -- $\left( \dfrac{p_f}{\sum_{j \in adj(i)} p_j} \right) \times p_i$ --

Column 12, line 15    Delete " $totalp \times b \times \dfrac{p_f}{\sum_{i \in adj(i)} p_j} \times p_i \times x_2$ "

Insert -- $totalp \times b \times \dfrac{p_f}{\sum_{j \in adj(i)} p_j} \times p_i \times x_2$ --

Column 12, line 27    Delete

" $$cost2 = totalp \times b \times \left[ (p_f \times x_1) - \sum_{i \in adj(t)} \dfrac{p_f}{\sum_{i \in adj(i)} p_j} \times p_i \times x_2 \right],  \quad (4)"$$

Insert $$-- cost2 = totalp \times b \times \left[ (p_i \times x_1) - \sum_{i \in adj(t)} \dfrac{p_i}{\sum_{j \in adj(i)} p_j} \times p_i \times x_2 \right], \quad (4) --$$

UNITED STATES PATENT AND TRADEMARK OFFICE
CERTIFICATE OF CORRECTION

PATENT NO. : 6,055,433
DATED : April 25, 2000
INVENTOR(S) : Yuan, et al.

Page 3 of 11

It is certified that error appears in the above-identified patent and that said Letters Patent is hereby corrected as shown below:

Column 12, line 53    Delete $$"benefit3 = totalp \times b \times \left[ \left( \sum_{i \in adj(f)} \frac{p_f}{\sum_{i \in adj(i)} p_j} \times p_i \times x_4 \right) - (p_f \times x_3) \right], \quad (5)"$$

Insert $$--benefit3 = totalp \times b \times \left[ \left( \sum_{i \in adj(f)} \frac{p_f}{\sum_{j \in adj(i)} p_j} \times p_i \times x_4 \right) - (p_f \times x_3) \right], \quad (5)--$$

Column 13, line 5    Delete $$"cost3 = totalp \times b \times \left[ \sum_{i \in adj(i)} \frac{p_f}{\sum_{i \in adj(i)} p_j} \right] \times p_i \times x_4 - (p_i \times x_3) \quad (6)"$$

Insert $$--cost3 = totalp \times b \times \left[ \sum_{i \in adj(t)} \frac{p_t}{\sum_{j \in adj(i)} p_j} \right] \times p_i \times x_4 - (p_i \times x_3) \quad (6)--$$

UNITED STATES PATENT AND TRADEMARK OFFICE
CERTIFICATE OF CORRECTION

PATENT NO. : 6,055,433
DATED : April 25, 2000
INVENTOR(S) : Yuan, et al.

It is certified that error appears in the above-identified patent and that said Letters Patent is hereby corrected as shown below:

Column 13, line 22    Delete $$"benefit4 = totalp \times b \times \sum_{\forall i \neq f} \left( p_i \times \frac{\sum_{j \in adj(i), j \neq f} p_j}{\sum_{i \in adj(i)} p_l} \right) \times x_5, \quad (7)"$$

Insert $$-- benefit4 = totalp \times b \times \sum_{\forall i \neq f} p_i \times \left[ \frac{\sum_{j \in adj(i), j \neq f} p_j}{\sum_{l \in adj(i)} p_l} \right] \times x_5, \quad (7)--$$

Column 13, line 30    Delete " $p_i \times \dfrac{\sum_{j \in adj(i), j \neq f} p_j}{\sum_{i \in adj(i)} p_l}$ "

Insert -- $p_i \times \dfrac{\sum_{j \in adj(i), j \neq f} p_j}{\sum_{l \in adj(i)} p_l}$ --

UNITED STATES PATENT AND TRADEMARK OFFICE
CERTIFICATE OF CORRECTION

PATENT NO. : 6,055,433
DATED : April 25, 2000
INVENTOR(S) : Yuan, et al.

It is certified that error appears in the above-identified patent and that said Letters Patent is hereby corrected as shown below:

Column 13, line 42   Delete $$"cost4 = totalp \times b \times \sum_{\forall i \neq f} \left[ p_i \times \frac{\sum_{j \in adj(i), j \neq f} p_j}{\sum_{i \in adj(i)} p_l} \right] \times x_5. \qquad (8)"$$

Insert $$-- cost4 = totalp \times b \times \sum_{\forall i \neq l} p_i \times \left[ \frac{\sum_{j \in adj(i), j \neq l} p_j}{\sum_{l \in adj(i)} p_l} \right] \times x_5. \qquad (8)--$$

Column 13, line 57   Delete "$totalp \times b \times p_f \times (x_1 - x_3)$"

Insert $$- benefit2 = totalp \times b \times \left[ (p_f \times x_1) - \sum_{i \in adj(f)} \frac{p_f}{\sum_{j \in adj(i)} p_j} \times p_i \times x_2 \right] + --$$

UNITED STATES PATENT AND TRADEMARK OFFICE
CERTIFICATE OF CORRECTION

PATENT NO. : 6,055,433
DATED : April 25, 2000
INVENTOR(S) : Yuan, et al.

It is certified that error appears in the above-identified patent and that said Letters Patent is hereby corrected as shown below:

Column 13, line 60  Delete "$totalp \times b \times \left( \sum_{\substack{\forall i \neq f \\ i \in adj(i)}} \frac{p_f}{\sum p_j} \times p_i \right) \times (x_4 - x_2)$"

Insert -- $totalp \times b \times \left[ \sum_{i \in adj(f)} \frac{p_f}{\sum_{j \in adj(i)} p_j} \times p_i \right] \times (x_4 - x_2) +$ --

Column 13, line 65  Delete "$totalp \times b \times \left[ \sum_{\forall i \neq f} p_i \times \frac{\sum_{j \in adj(i), j \neq t} p_j}{\sum_{i \in adj(i)} p_l} \right] \times x_5.$"

Insert -- $totalp \times b \times \left[ \sum_{\forall i \neq f} p_i \times \frac{\sum_{j \in adj(i), j \neq t} p_j}{\sum_{l \in adj(i)} p_l} \right] \times x_5.$ --

UNITED STATES PATENT AND TRADEMARK OFFICE
CERTIFICATE OF CORRECTION

PATENT NO. : 6,055,433
DATED : April 25, 2000
INVENTOR(S) : Yuan, et al.

It is certified that error appears in the above-identified patent and that said Letters Patent is hereby corrected as shown below:

Column 14, line 6   Delete " $totalp \times b \times \left[ (p_t \times x_1) = \sum_{i \in adj(t)} \frac{p_t}{\sum_{i \in adj(i)} p_j} \times p_i \times x_2 \right] +$ "

Insert -- $totalp \times b \times \left[ (p_t \times x_1) - \sum_{i \in adj(t)} \frac{p_t}{\sum_{j \in adj(i)} p_j} \times p_i \times x_2 \right] +$ --

Column 14, line 9   Delete " $totalp \times b \times \left[ \sum_{i \in adj(t)} \frac{p_t}{\sum_{i \in adj(i)} p_j} \times p_i \times x_4 - (p_t \times x_3) \right] +$ "

Insert -- $totalp \times b \times \left[ \sum_{i \in adj(t)} \frac{p_t}{\sum_{j \in adj(i)} p_j} \times p_i \times x_4 - (p_t \times x_3) \right] +$ --

UNITED STATES PATENT AND TRADEMARK OFFICE
CERTIFICATE OF CORRECTION

PATENT NO. : 6,055,433
DATED : April 25, 2000
INVENTOR(S) : Yuan, et al.

It is certified that error appears in the above-identified patent and that said Letters Patent is hereby corrected as shown below:

Column 14, line 13　　Delete " $totalp \times b \times \sum_{\forall i \neq t} p_i \times \left[ \sum_{i \in adj(i), j \neq t} \frac{p_j}{\sum_{i \in adj(i)} p_l} \right] \times x_5.$ "

Insert -- $totalp \times b \times \sum_{\forall i \neq t} p_i \times \left[ \sum_{j \in adj(i), j \neq t} \frac{p_j}{\sum_{l \in adj(i)} p_l} \right] \times x_5.$ --

Column 14, line 52　　Delete "execution" and insert --executed--

Column 15, line 9　　Delete "limited" and insert --limit--

Column 16, line 5　　Delete " $totalp \times b \times \left[ (p_f \times x_1) - \sum_{i \in adj(f)} \frac{p_f}{\sum_{i \in adj(i)} p_j} \times p_i \times x_2 \right] +$ "

Insert -- $totalp \times b \times \left[ (p_f \times x_1) - \sum_{i \in adj(f)} \frac{p_f}{\sum_{j \in adj(i)} p_j} \times p_i \times x_2 \right] +$ --

UNITED STATES PATENT AND TRADEMARK OFFICE
CERTIFICATE OF CORRECTION

PATENT NO. : 6,055,433
DATED : April 25, 2000
INVENTOR(S) : Yuan, et al.

It is certified that error appears in the above-identified patent and that said Letters Patent is hereby corrected as shown below:

Column 16, line 9   Delete " $totalp \times b \times \left[ \sum_{i \in adj(f)} \frac{p_f}{\sum_{i \in adj(i)} p_j} \times p_i \times x_4 - (p_f \times x_3) \right] +$ "

Insert -- $totalp \times b \times \left[ \sum_{i \in adj(f)} \frac{p_f}{\sum_{j \in adj(i)} p_j} \times p_i \times x_4 - (p_f \times x_3) \right] +$ --

Column 16, line 13   Delete " $totalp \times b \times \sum_{\forall i \neq t} p_i \times \left[ \sum_{i \in adj(i), j \neq t} \frac{p_j}{\sum_{i \in adj(i)} p_l} \right] \times x_5.$ "

Insert -- $totalp \times b \times \sum_{\forall i \neq f} p_i \times \left[ \sum_{j \in adj(i), j \neq t} \frac{p_j}{\sum_{l \in adj(i)} p_l} \right] \times x_5.$ --

Column 17, line 14   Delete "a" and insert --the--

Column 17, line 17   Delete "consecutively"

UNITED STATES PATENT AND TRADEMARK OFFICE
CERTIFICATE OF CORRECTION

PATENT NO. : 6,055,433  
DATED : April 25, 2000  
INVENTOR(S) : Yuan, et al.

Page 10 of 11

It is certified that error appears in the above-identified patent and that said Letters Patent is hereby corrected as shown below:

Column 21, line 6    Delete " $totalp \times b \times \left[ (p_f \times x_1) - \sum\limits_{i \in adj(f)} \dfrac{p_f}{\sum\limits_{i \in adj(f)} p_j} \times (p_i \times x_2) \right] + $ "

Insert -- $totalp \times b \times \left[ (p_f \times x_1) - \sum\limits_{i \in adj(f)} \dfrac{p_f}{\sum\limits_{j \in adj(i)} p_j} \times p_i \times x_2 \right] + $ --

Column 21, line 10    Delete " $totalp \times b \times \left[ \sum\limits_{i \in adj(f)} \dfrac{p_f}{\sum\limits_{i \in adj(f)} p_j} \times p_i \times x_4 - (p_f \times x_3) \right] + $ "

Insert -- $totalp \times b \times \left[ \sum\limits_{i \in adj(f)} \dfrac{p_f}{\sum\limits_{j \in adj(i)} p_j} \times p_i \times x_4 - (p_f \times x_3) \right] + $ --

UNITED STATES PATENT AND TRADEMARK OFFICE
CERTIFICATE OF CORRECTION

PATENT NO. : 6,055,433
DATED : April 25, 2000
INVENTOR(S) : Yuan, et al.

It is certified that error appears in the above-identified patent and that said Letters Patent is hereby corrected as shown below:

Column 22, line 1  Delete " $totalp \times b \times \sum_{\forall i \neq t} p_i \times \left[ \sum_{i \in adj(i), j \neq t} \frac{p_j}{\sum_{i \in adj(i)} p_i} \right] \times x_5.$ "

Insert -- $totalp \times b \times \sum_{\forall i \neq f} p_i \times \left[ \sum_{j \in adj(i), j \neq f} \frac{p_j}{\sum_{l \in adj(i)} p_l} \right] \times x_5.$ --

Signed and Sealed this

Twenty-ninth Day of May, 2001

Attest:

NICHOLAS P. GODICI

*Attesting Officer*    *Acting Director of the United States Patent and Trademark Office*